C. B. KING, C. B. WESTON, H. E. ROUSH & G. HOLMES.
BRAKE DRUM.
APPLICATION FILED JAN. 10, 1912.
1,159,502.
Patented Nov. 9, 1915.
2 SHEETS—SHEET 1.
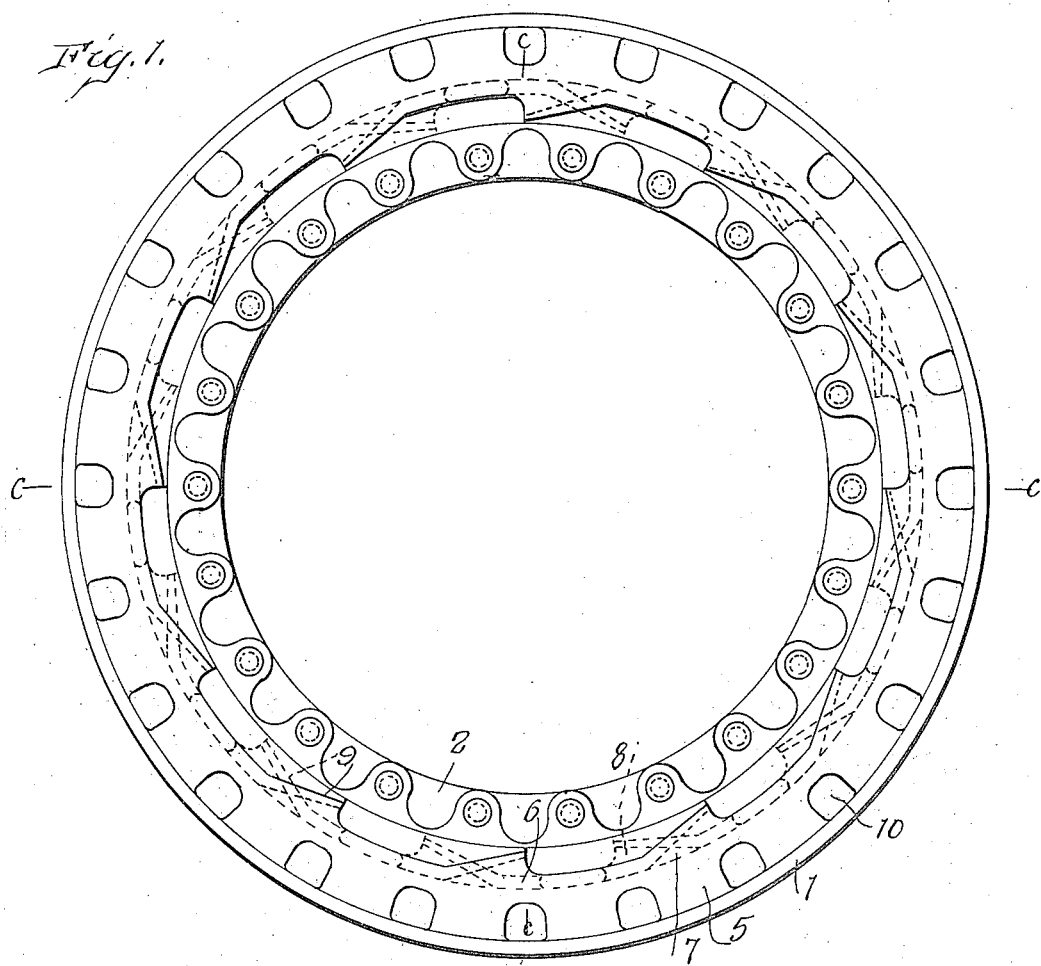
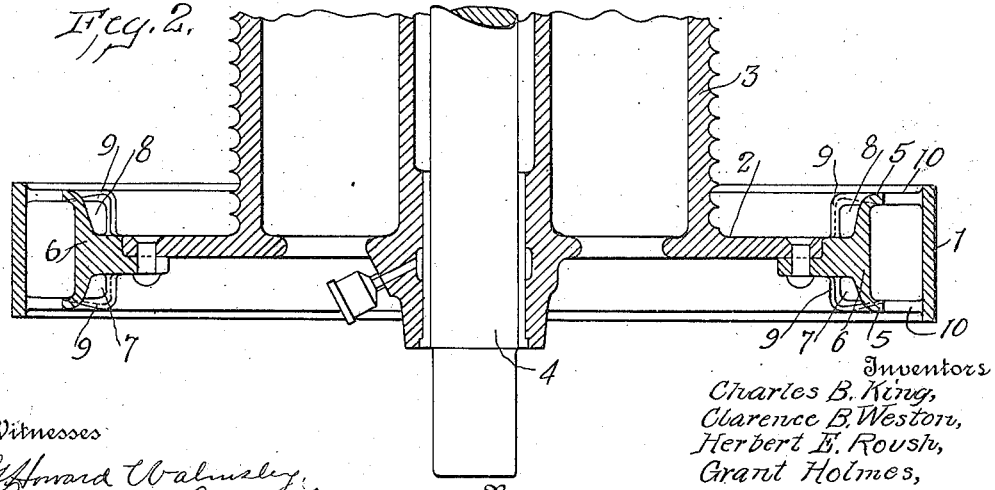

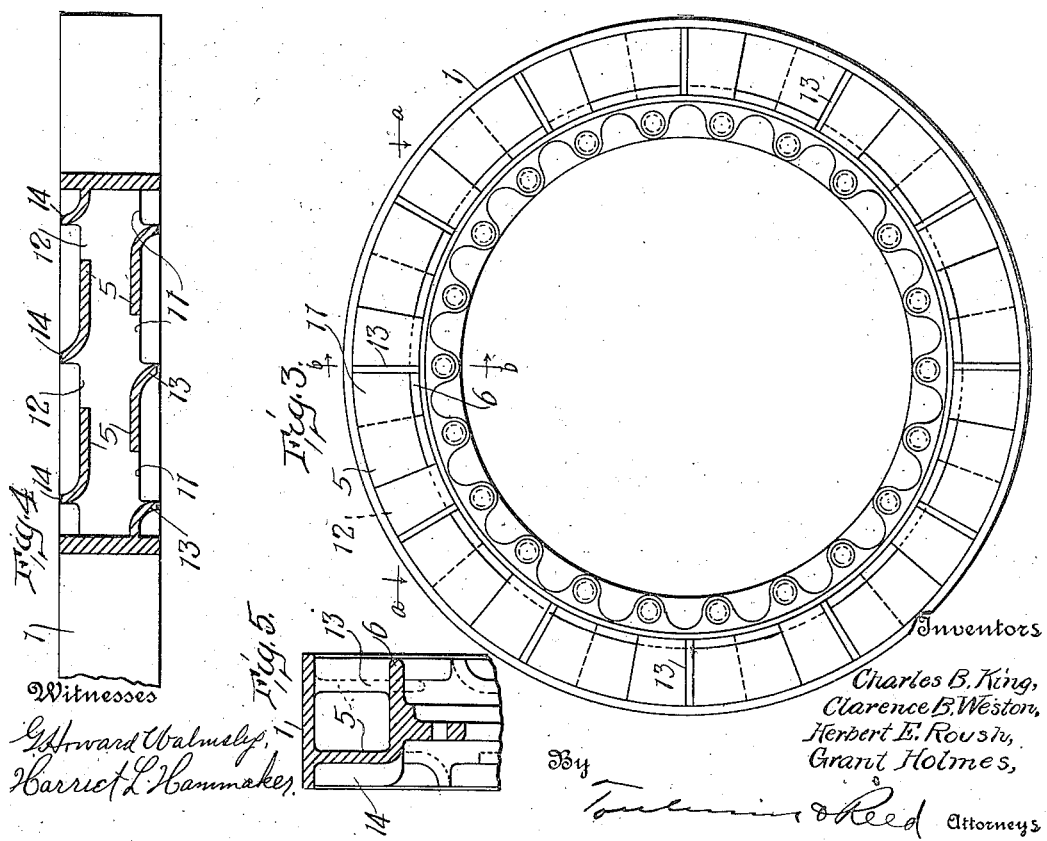

UNITED STATES PATENT OFFICE.

CHARLES B. KING, CLARENCE B. WESTON, AND HERBERT E. ROUSH, OF MARION, OHIO, AND GRANT HOLMES, OF DANVILLE, ILLINOIS, ASSIGNORS TO THE MARION STEAM SHOVEL COMPANY, OF MARION, OHIO, A CORPORATION OF OHIO.

BRAKE-DRUM.

1,159,502.

Specification of Letters Patent.

Patented Nov. 9, 1915.

Application filed January 10, 1912. Serial No. 670,468.

*To all whom it may concern:*

Be it known that we, CHARLES B. KING, CLARENCE B. WESTON, and HERBERT E. ROUSH, all residing at Marion, in the county of Marion and State of Ohio, and GRANT HOLMES, residing at Danville, in the county of Vermilion and State of Illinois, citizens of the United States, have invented certain new and useful Improvements in Brake-10 Drums, of which the following is a specification, reference being had therein to the accompanying drawings.

This invention relates to brake-drums and the object of the invention is to provide an air-cooled brake-drum.

To this end it is a further object of the invention to so construct the drum that air will be caused to circulate adjacent to or in contact with the inner side of the rim of the drum.

In the accompanying drawings, Figure 1 is a side elevation of a brake-drum embodying our invention; Fig. 2 is a section taken on the line *c c* of Fig. 1; Fig. 3 is a side elevation of the brake-drum showing the invention applied thereto in a modified form; Fig. 4 is a section taken on the line *a a* of Fig. 3 and looking in the direction of the arrows; and Fig. 5 is a section taken on the line *b b* of Fig. 3.

In these drawings we have illustrated several embodiments of our invention which, while differing slightly in their details of construction, embody the same essential features. In each instance the drum is provided with devices which cause the air to circulate in a path adjacent to or in contact with the inner side of the rim of the drum, thus causing the rim to be subjected to the cooling action of the air. In each instance the drum comprises a housing arranged on the inner side of the rim and having one or more conduits, the outer wall of which is formed by the rim of the drum. These conduits are in open communication with the air and are preferably provided with openings at different points to permit the ingress and egress of the air. When the drum is revolving rapidly the air will be caused to enter the conduits through one of the openings therein and to circulate within the conduit adjacent to and in contact with the rim.

In Figs. 1 and 2 we have shown the invention as applied to a brake-drum comprising a rim 1 connected by means of a web 2 with a cable drum 3 which, in turn, is mounted upon a shaft 4. Interposed between the web 2 and the rim is a housing comprising side walls 5 and a base or inner wall 6. The outer wall of the housing is formed by the rim 1 of the drum. The inner wall of the housing is provided on each side of the web 2 with a series of openings 7 and 8 connecting the interior of the housing with the atmosphere. Each opening is provided with a deflector which, in the present instance, comprises an outwardly flared lip 9. The lips on one side of the web are flared in one direction and those on the other side of the web are flared in the opposite direction. Consequently, one series of lips will be flared in the direction of rotation of the drum when the latter is rotated in either direction. The outwardly flared lips serve to provide the openings with mouths opening in the direction in which the lips are flared and through which the air is directed into the interior of the housing. It is also desirable, though not essentially necessary, that the side walls 5 of the housing be provided with openings 10 to permit the escape of the air. When the drum is rotated in one direction the lips 9 which are flared outwardly in the direction in which the drum is rotating will deflect the air through the openings in the inner wall of the housing and cause the same to impinge against the inner side of the rim of the drum and to circulate through the hollow interior of the drum, which hollow interior constitutes a conduit for the air. The openings 10 in the side walls of the rim permit the escape of the air from the housing and prevent all compression. Obviously, the circulation of the air through the conduit in the housing and its contact with the inner surface of the rim will have a very marked cooling action upon the rim.

In Figs. 3, 4 and 5 of the drawings we have shown a brake-drum provided with a housing similar to that shown in Figs. 1 and 2 but instead of providing the housing with openings in the inner wall thereof we have formed the openings in the side walls only of the housing, as indicated at 11 and 12. The openings 11 are provided at their rear edges with lips 13, all of which are flared outwardly in the same direction. The openings 12 in the opposite side wall of the housing are provided with lips 14, all of which are flared outwardly in the same direction, this direction being opposite to the direction in which the lips 13 are flared. In this construction the air will be deflected into the conduit within the housing when the drum is rotated in either direction and will be caused to circulate within said conduit adjacent to and in contact with the inner surface of the rim.

We have shown and described several forms of brake-drum embodying our invention but it will be understood that these are chosen for the purpose of illustration and that the invention is not confined to the forms of the several devices here shown and described, nor is it confined to brake-drums but is applicable to rotary members of various kinds having an annular surface subjected to friction. It will also be understood that the term "circumferential" is herein employed as meaning in a circumferential direction and extending either for a whole or a part of the circumference of the drum. Further, it will be understood that should any surface of the drum other than the outer surface of the rim thereof be utilized as the contact or friction surface and the air conduit arranged adjacent to the opposite surface, such a construction and arrangement would be the full equivalent of that herein shown and described in which the outer surface is the contact surface and the inner surface is the one acted upon by the air currents.

Having thus fully described our invention, what we claim as new and desire to secure by Letters Patent, is:—

1. A rotatable drum comprising a rim having a contact surface, and an inner surface, said drum also having an air conduit adjacent to the inner surface of said rim, extending in a circumferential direction and provided in one wall with an inlet and in another wall with an outlet.

2. A rotatable drum comprising a rim having a contact surface and an inner surface, said drum also having an air conduit, one wall of which is formed by the inner surface of said rim, said conduit extending in a circumferential direction and having an inlet opening in that wall opposite the inner surface of said rim.

3. A rotatable drum comprising a rim having a contact surface and an inner surface, said drum also having an air conduit, one wall of which is formed by the inner surface of said rim, said conduit extending in a circumferential direction and having an inlet opening in that wall opposite the inner surface of said rim, and a forwardly extending deflector to deflect the air through said inlet opening, into engagement with and circumferentially along the inner surface of said rim.

4. A rotatable drum comprising a rim having a contact surface and an inner surface, said drum having an air conduit extending along the inner surface of said rim and in a circumferential direction, said conduit having two series of openings, the openings of one series having their mouths directed in one direction of rotation of said drum and the openings of the other series having their mouths directed in the other direction of rotation of said drum.

5. A rotatable drum comprising a rim having a contact surface and an inner surface, said drum having an air conduit extending along the inner surface of said rim and in a circumferential direction, said conduit having two series of openings, one on each side of the center thereof, the openings of one series having their mouths directed in one direction of rotation of said drum and the openings of the other series having their mouths directed in the other direction of rotation of said drum.

6. A rotatable drum comprising a hollow housing extending entirely about the circumference of said drum, the outer wall of said housing being formed by the rim of the drum and the inner wall of said housing having two circumferential series of openings, the openings of one series having lips flared in one direction, the openings of the other series having lips flared in the opposite direction, and the walls of the housing having other openings between said inner wall and said rim.

In testimony whereof we affix our signatures in the presence of two witnesses.

CHARLES B. KING.
CLARENCE B. WESTON.
HERBERT E. ROUSH.
GRANT HOLMES.

Witnesses to the signatures of C. B. King, C. B. Weston, and H. E. Roush:
  H. H. CONNOLLY,
  R. H. ROSSITER.

Witnesses to the signature of Grant Holmes:
  FRED B. PENWELL,
  GERTRUDE C. KOCH.